United States Patent Office 3,364,790
Patented Jan. 23, 1968

3,364,790
POWER TRANSMISSION MEANS
Jean-Jacques Asper and Aymar Lefrancois, Geneva, Switzerland, assignors to Battelle Memorial Institute, Geneva, Switzerland
Filed May 7, 1965, Ser. No. 454,010
Claims priority, application Switzerland, May 8, 1964, 6,051/64
4 Claims. (Cl. 74—687)

ABSTRACT OF THE DISCLOSURE

A power transmission means comprising a pair of power shafts M, S; speed variator means including at least one first and one second variator unit A, B respectively, connected to one another and having a shaft 5, 6 respectively; control means for continuously varying the ratio between the speeds of the shafts of said first and second unit within each said speed range and for blocking one of the shafts of said first and second variator units at the transition from one speed range to the next; epicyclic gearing providing a power connection between said pair of power shafts, said gearing including a planet-carrier E, three planet gears $r_2$, $r_m$, $r_s$ mounted together for common rotation on said planet-carrier, and three sun gears $R_2$, $R_m$, $R_s$ respectively meshing with said three planet gears. A first and second ($R_m$, $R_s$) of said three sun gears is permanently drivingly connected with one shaft of the pair of power shafts; first and second coupling means $f_1$, $f_3$ selectively couple the shaft of said first variator unit A either with a first shaft of the pair of power shafts or with the planet-carrier. Third and fourth coupling means $f_2$, $f_4$ selectively couple the shaft of the second variator unit B either with the third sun gear $R_2$ or with the second shaft of said pair of power shafts; and means for selectively rendering the coupling means operative to provide three speed ranges, the shaft of the first unit A being coupled to the first coupling means $f_1$ with the power shaft in a first speed range and by said second coupling means $f_3$ with the planet-carrier E in the second and third speed ranges, while the shaft of the second unit B is coupled by said third coupling means $f_2$ with said third sun gear $R_2$ in said first and second speed ranges and by said fourth coupling means $f_4$ with said second shaft in said third speed range.

This invention relates to continuous speed changing power transmission means of the kind comprising a power input shaft and a coaxial power output shaft connected by epicyclic gearing with at least two interconnected continuous speed variator units connected to said gearing and controlled by regulator means.

In transmission means of this kind, the speed variators are for example formed by reversible hydrostatic units, i.e. units operating alternately as a pump or as a motor depending on whether power is to be received from the mechanical part of the transmission means or whether power is to be supplied thereto. These hydrostatic units enable the transmission ratios of the epicyclic gearing to be varied in continuous fashion by acting on the reaction members of the gearing, notably on the planet-carrier.

The efficiency of these hydrosatic units being less high than that of the mechanical part of the transmission means, it has been sought to divert as little power as possible from the mechanical part of the transmission means to the hydrostatic units to obtain a good overall efficiency.

The solutions proposed so far in the traction field, notably for Diesel engine locomotives, have generally led to inordinately large dimensioning of the hydrostatic units of the transmission means and consequently to a prohibitive weight in relation to the power involved.

An object of the present invention is to overcome these drawbacks and to provide transmission means of simpler design.

The power transmission means according to the invention provides a plurality of speed ranges with continuous speed variation within each range and comprises: a pair of coaxial power shafts; first and second controllable speed variator units connected to one another and each having a shaft; first and second pinions rigid with the shaft of said first speed variator unit; third and fourth pinions rigid with the shaft of said second variator units; fifth and sixth pinions rotatably mounted around one of said pair of coaxial power shafts and respectively meshing with said first and second pinions; seventh and eighth pinions rotatably mounted around the other of said pair of coaxial power shafts and respectively meshing with said third and fourth pinions; epicyclic gearing providing a power connection between said pair of coaxial power shafts, said gearing including a first sun gear rigid with said one power shaft, a second sun gear rotatably mounted around said one power shaft, a third sun gear rigid with said other power shaft, a planet-carrier rotatably mounted around said power shafts and three compound planet gears rotatably mounted on said planet-carrier and respectively meshing with said three sun gears; first releasable coupling means associated with said fifth pinion and said one power shaft for releasably coupling said fifth pinion with said one power shaft; second relasable coupling means associated with said sixth pinion and said second sun gear for releasably coupling said sixth pinion with said second sun gear; third releasable coupling means associated with said planet-carrier and said seventh pinion for releasably coupling said planet-carrier with said seventh pinion; fourth releasable coupling means associated with said other power shaft and said eighth pinion for releasably coupling said eighth pinion with said other power shaft; and means for selectively rendering at least said first and third, said second and third or said second and fourth coupling means operative to provide three speed ranges in which at least a major proportion of the power can be transmitted through said epicyclic gearing, the remainder being transmitted through said first and second speed variator units which alternately act as a motor and pump and as a pump and motor, the transition point from one speed range to an adjacent speed range corresponding to a particular speed ratio between said pair of coaxial power shafts and the passage from said one speed range to said adjacent speed range taking place when one of said variator units is blocked thereby to synchronize the parts to be coupled or released by one of said releasable coupling means upon actuation thereof.

For a better understanding of the invention and to show how it may be carried into effect, the same will now be described by way of example with reference to the accompanying drawings in which.

The illustrated power transmission apparatus is intended to be used for traction and has in particular been designed for a Diesel engine locomotive of 4000 H.P.

This apparatus comprises a power input shaft M intended to be coupled to the drive shaft and a coaxial power output shaft S used for driving the wheels of a bogie, these shafts being connected by an epicyclic gearing mechanism mounted in a casing C termed a planetary casing. Hydrostatic units A and B, each forming a continuous speed variator, are connected to the epicyclic gearing mechanism as will be described below and are controlled by a regulator member which can be a hand-wheel or another member governed by automatic control means dependent on the operating conditions of the locomotive.

Figure 1:
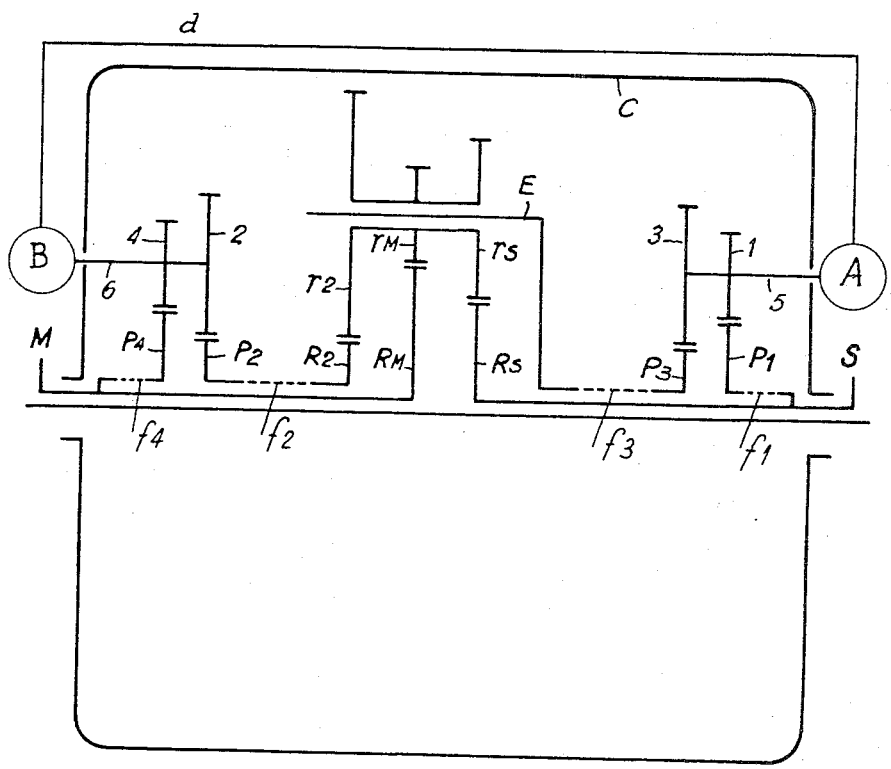
FIGURE 1 is a schematic outline of transmission means according to the invention.

The epicyclic gearing mechanism includes a planet-carrier E that can be coupled to a coaxial pinion $P_3$, rotatably mounted around shaft S, through the intermediary of a coupling schematically represented at $f_3$ by a broken line, pinion $P_3$ meshing with a pinion 3 rigid with a shaft 5 of the hydrostatic unit A. Triple planet gears $r_2$, $r_M$, $r_S$ are rotatably mounted on the planet-carrier E and mesh with corresponding sun gears $R_2$, $R_M$, $R_S$ respectively. Free rotatable sun gear $R_2$ can be coupled with a coaxial freely rotatable pinion $P_2$ through the intermediary of a coupling $f_2$ similar to coupling $f_3$, which pinion $P_2$ meshes in turn with a pinion 2 rigid with a shaft 6 of the hydrostatic unit B. The second and third sun gears $R_M$ and $R_S$ are respectively rigid with the input shaft M and the output shaft S. Shafts 5 and 6 of the hydrostatic units A and B further carry rigidly pinions 1 and 4, respectively, pinion 1 meshing with a coaxial output pinion $P_1$ which is freely rotatable around shaft S and that can be connected thereto by a coupling $f_1$ and, similarly, pinion 4 meshing with a coaxial input pinion $P_4$ which is freely rotatable around shaft M and that can be connected thereto by a coupling $f_4$ (FIGURE 1).

Figure 2:
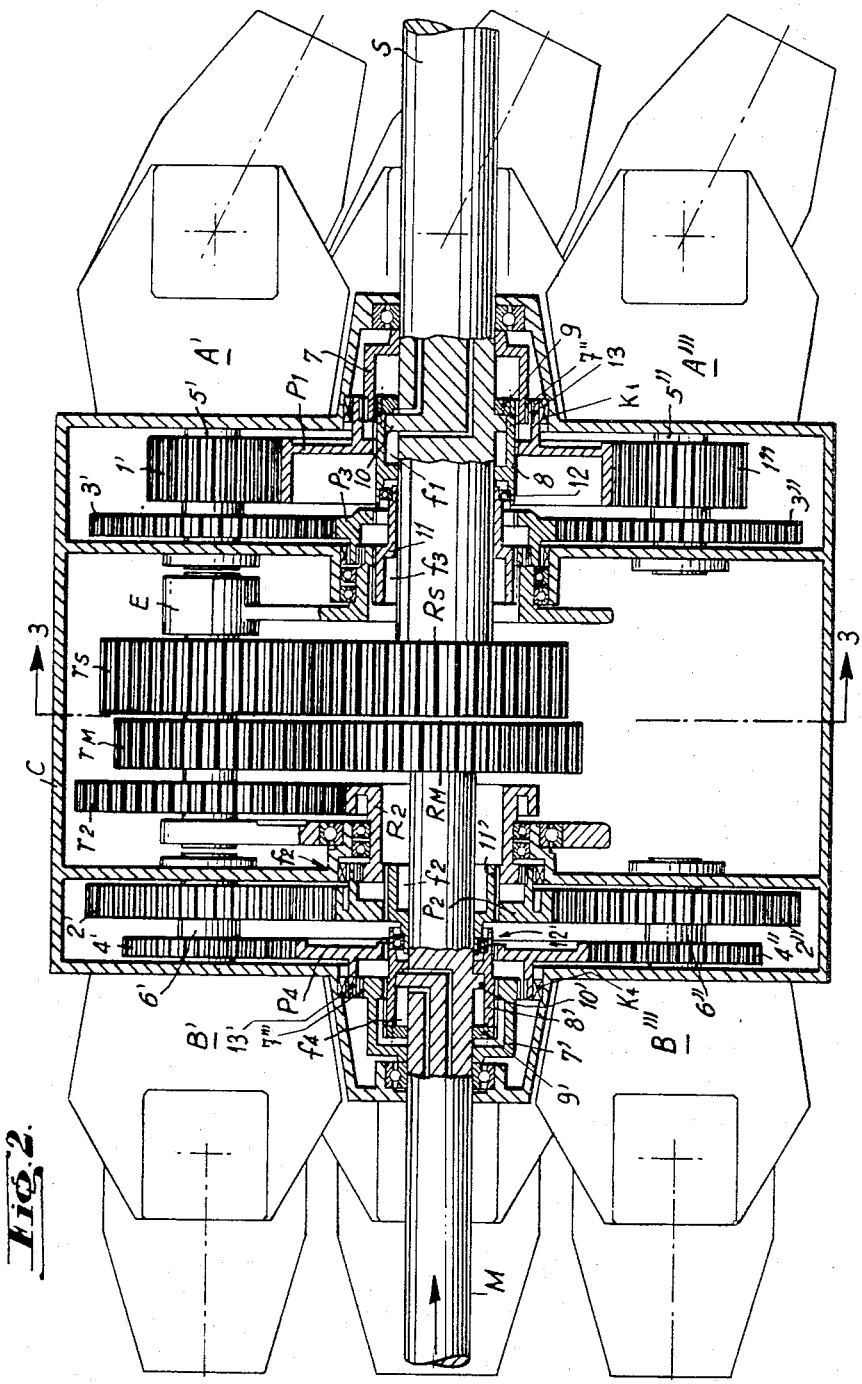
FIGURE 2 is an axial section, taken on line 2—2 of FIGURES 3 and 4, of a particular constructional form of these transmission means.
Figure 3:
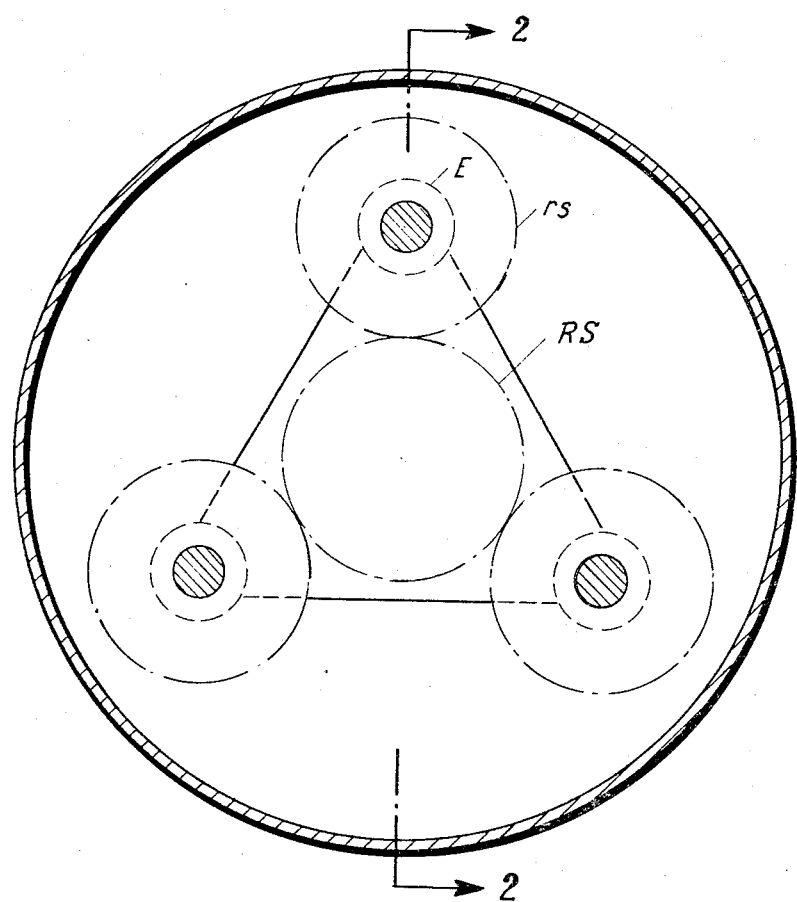
FIGURE 3 is a radial section taken on line 3—3 of FIGURE 2.
Figure 4:
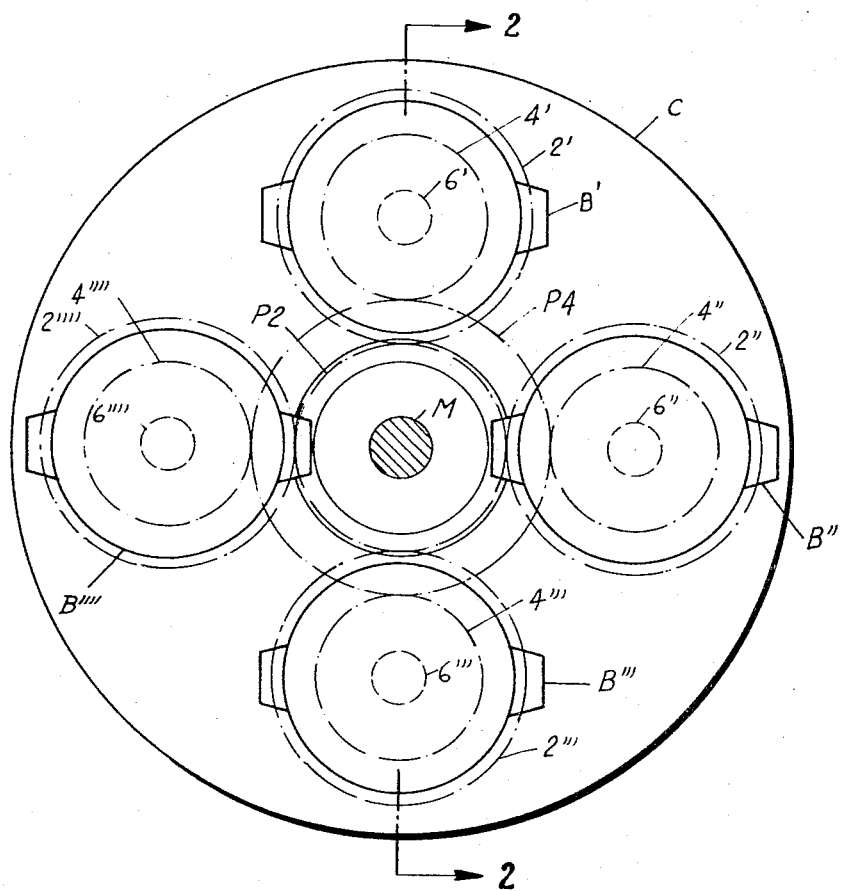
FIGURE 4 is an end view in the direction of the arrow in FIGURE 2.

The hydrostatic units A and B, are of the known tiltable swash-plate type, and are hydraulically coupled by a conduit $d$ and include each four elements $A'$, $A''$, $A'''$, $A''''$ and $B'$, $B''$, $B'''$, $B''''$ hydraulically coupled in parallel and circularly arranged at each end of casing C (FIGURES 2 and 4).

In FIGURE 2 there are shown, in a more constructional manner, the various mechanical components mounted in casing C. The couplings $f_1$, $f_4$ each notably include a sleeve 7, 7', secured to the output shaft S and the input shaft M, respectively, for example by keying. The sleeves 7 and 7' are provided at their peripheries with respective copper studs 7'' and 7''' rotating opposite similar studs 13 and 13' also made of copper, mounted on the inside of a cylindrical flange rigid with pinions $P_1$ and $P_4$. This arrangement forms part of a magnetic speed and angular position synchronizer of known type, the exciter coils of which have been schematically indicated at $K_1$ and $K_4$. More particularly, the copper studs serve to magnetically couple the pinions $P_1$ and $P_4$ and the sleeves 7 and 7'. Upon excitation of coils $K_1$ and $K_4$, a strong torque is produced between sleeve 7 and pinion $P_1$ and sleeve 7 and pinion $P_4$, respectively, at different speed rotations thereof, tending to make the speeds equal. Furthermore, once both rotation speeds become nearly equal, the associated pinion and sleeve are drawn into an angular position in which the studs are opposite one another so that exactly synchronous operation occurs.

The inner portions of sleeves 7 and 7' are splined and mesh with similar splines of respective tubular members 8 and 8' closed by respective annular plates 9 and 9'. The tubular members 8 and 8' are axially movable along shafts S and M by hydraulic control means of which two pressurized fluid feeding ducts are formed within the shafts and open on opposite sides of flanges 10 and 10' solid with the corresponding shafts S and M. In the illustrated position, tubular member 8 is in meshing engagement through its splined outer portion with both sleeve 7 and output pinion $P_1$, thus in effect connecting the latter directly to shaft S, whereas tubular member 8' only meshes with sleeve 7', the input pinion $P_4$ being free.

Couplings $f_3$, $f_2$ include respective externally splined tubular member 11, 11' axially movable with tubular member 8, 8', these two tubular members being respectively connected to one another by roller bearings 12, 12' enabling relative rotary movement of one tubular member with respect to the other. In the illustrated position, tubular member 11 only meshes with planet-carrier E whose internally splined hub cooperates with the corresponding portion of this tubular member, pinion $P_3$ being free, whereas tubular member 11', which meshes through its externally splined portion with pinion $R_2$ and pinion $P_2$, renders these two pinions solid with one another.

The outer periphery of the hub of planet-carrier E (of pinion $R_2$) is provided with copper studs that are analogous to those of sleeves 7, 7' and which cooperate with similar copper studs mounted on the inside of an annular flange rigid with pinions $P_3$ and $P_2$ to form also a speed and angular position synchronizer whose exciter windings are schematically indicated as in the case of the previously described synchronizer.

By feeding fluid under pressure to the right of flange 10, tubular members 8 and 10 are moved to the right, with member 8 moving out of engagement with output pinion $P_1$ and member 11 moving into engagement with pinion $P_3$. At the other end, by feeding fluid under pressure to the right of flange 10', tubular member 11' moves to the right with tubular member 8' and disengages pinion $P_2$, with member 8' then engaging input pinion $P_4$.

Figure 5:
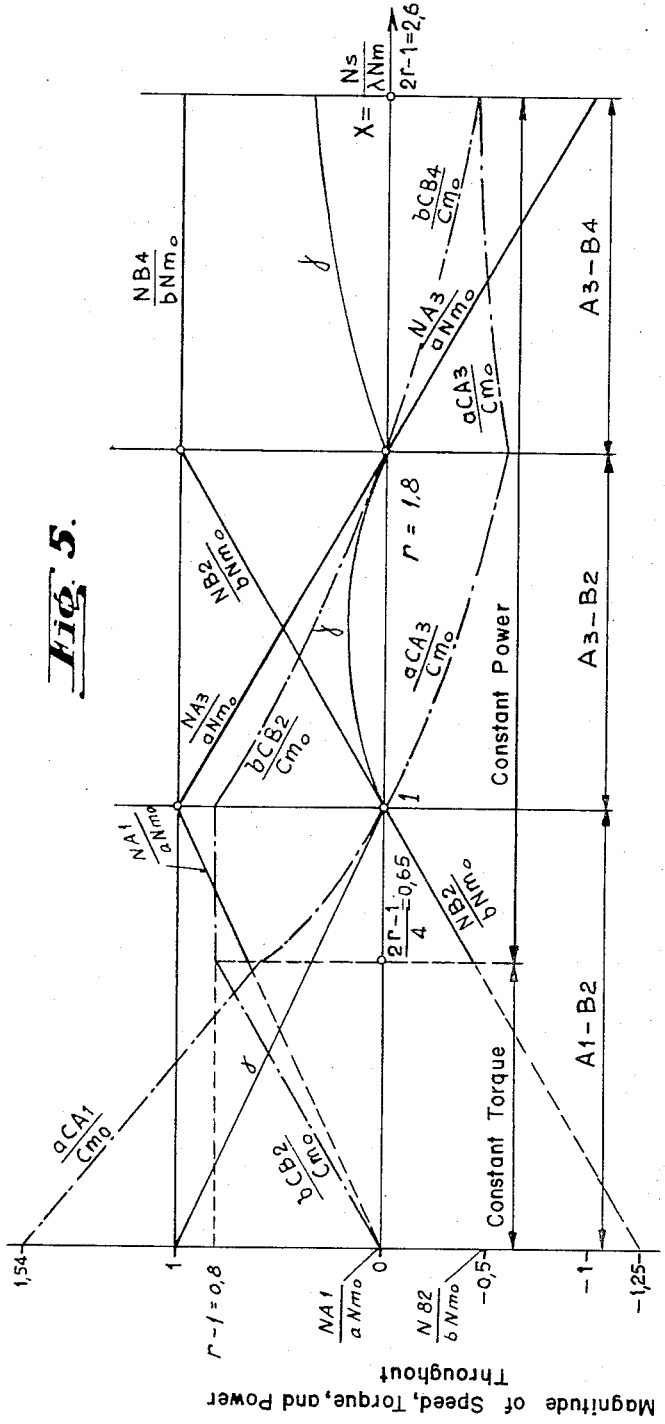
FIGURE 5 is an explanatory diagram.

The FIGURE 5 diagram shows the speed, torque and power throughput variations in the hydrostatic units A and B. The abscissa in FIG. 5 is the quotient $$X = \frac{Ns}{\lambda \cdot Nm}$$

The symbols $Ns$ and $Nm$ represent the speeds of the output and input shafts S and M respectively, so that $Ns/Nm$ is the overall drive ratio. The symbol $\lambda$ represents a constructional parameter equal to the value of the driven ratio $Ns/Nm$ when the sun pinion $R_2$ is blocked. It may thus be seen that the abscissa X represents the overall drive ratio of the power transmission means, multiplied by a constant factor $(1/\lambda)$.

The ordinate of the diagram in FIG. 5 represents the speed, torque and power throughput of the hydrostatic units A and B:

(1) *Speed ordinate* $(N)$.—The speeds of the units A and B are expressed by $$\frac{NA}{aNm_o} \text{ and } \frac{NB}{bNm_o}$$

respectively. NA and NB are the respective speeds of units A and B: $a$ and $b$ are constructional parameters and defined at the bottom of page 9 of the specification; $Nm_o$ is the maximum speed of the input shaft M and thus has a constant value depending on the prime mover used.

(2) *Torque ordinate* $(C)$.—The torques of the units A and B are expressed by $$\frac{aCA}{Cm_o} \text{ and } \frac{bCB}{Cm_o}$$

respectively. CA and CB are the respective torques transmitted by units A and B; $a$ and $b$ are the same constructional parameters as mentioned above, while $Cm_o$ is the maximum torque delivered by the input shaft M, and thus has a constant value depending on the prime mover used.

(3) *Power-throughput ordinate* $(\gamma)$.—The symbol $\gamma$ expresses the ratio between the power passing through the hydrostatic units and the power transmitted to the output shafts.

It may also be mentioned that the suffixes 1 to 4 indicate the respective coupling conditions of the units A and B.

The diagram is divided into two operational zones. In the so-called constant power zone, the power transmitted to the output shaft is assumed to be constant, the input shaft M rotating at maximum speed $Nm_0$ and transmitting maximum torque $Cm_0$.

In the so-called constant torque zone, the torque transmitted to the output shaft is assumed to be constant, the speed of the input shaft M being defined by the quotient $$\delta(X) = \frac{Nm}{Nm_0}$$

For simplification purposes, the efficiencies of the hydrostatic units have been assumed to be equal to unity.

The diagram is divided into three speed ranges A1–B2, A3–B2, A3–B4. For each speed range, a single coupling is used for the hydrostatic units, A($f_1$ or $f_3$) and B($f_2$ or $f_4$). The different speed ranges are defined as follows depending on the couplings resorted to:

| | |
|---|---|
| A1–B2 | $f_1$ and $f_2$ |
| A3–B2 | $f_3$ and $f_2$ |
| A3–B4 | $f_3$ and $f_4$ |

In the diagram there are shown in terms of X:

(1) The speeds of the hydrostatic units A and B defined by the values $$\frac{NA1}{aNm_0} \text{ or } \frac{NA3}{aNm_0}, \frac{NB2}{bNm_0} \text{ or } \frac{NB4}{bNm_0}$$

respectively.

$a$ is a constructional parameter which is defined as being, when pinion $R_2$ is blocked, the particular value of quotients $$\frac{NA1}{Nm} \text{ and } \frac{NA3}{Nm}$$

then equal by construction.

$b$ is a constructional parameter which is defined as being, when planet-carrier E is blocked, the particular value of quotients $$\frac{NB2}{Nm} \text{ and } \frac{NB3}{Nm}$$

then equal by construction.

(2) The torques transmitted by the hydrostatic units A and B defined by the values $$\frac{aCA1}{Cm_0} \text{ or } \frac{aCA3}{Cm_0}, \frac{bCB2}{Cm_0} \text{ or } \frac{bCB4}{Cm_0}$$

respectively.

(3) The value of $\gamma$ always indicating the ratio between the power passing through the hydrostatic units and the power transmitted to the output shaft.

The operation of the transmission means from $X=0$ (starting) to $X=2r-1$ (maximum speed) may be understood with the help of the diagram constructed on the supposition that $r=1.8$, $r$ being a constructional parameter analogous to $\lambda$ and defined as the quotient of particular values of $X$ obtained by respectively blocking the planet-carrier E and the sun gear $R_2$.

Just before starting ($X=0$, A1–B2 range), unit A is set to maximum flow per revolution (with its swash-plate at maximum tilt) and hydraulically blocked whereas unit B is set to zero flow (non tilted plate). Shaft S, which is locked to unit A, is also blocked whereas shaft M can rotate freely at an idling speed defined by $\delta$.

The speeds of units A and B are defined by $$\frac{NA1}{aNm_0} = 0$$

(independent of $\delta$) and $$\frac{NB2}{bNm_0} = 0.5$$

(dependent on $\delta = 0.4$ which corresponds to the idling speed of the Diesel engine).

Torques CA1 and CB2 do not depend on $\delta$ and are defined by:

$$\frac{aCA1}{Cm_0} = 1.54$$

and $$\frac{bCB2}{Cm_0} = 0$$

From $X=0$ to $X=1$, the flow per revolution of unit A is reduced from its maximum value to 0, whereas the flow per revolution of unit B is progressively increased from 0 to its maximum value.

The speeds can be defined in terms of X in the constant torque zone only if the function $\delta(X)$ is set. This function can for example be set so as to achieve minimum consumption by the Diesel engine.

From $$x = \frac{2r-1}{4}$$

and up to $X=1$ (constant power), the speeds of the hydrostatic units are perfectly defined.

The speed of unit A increases to its maximum value $$\left(\frac{NA1}{aNm_0} = 1\right)$$

while the speed of unit B decreases (in absolute terms) to 0.

The torques transmitted by the hydrostatic units are defined over the entire A1–B2 range.

The torque transmitted by unit A decreases from the value corresponding to $$\frac{aCA1}{Cm_0} = 1.54$$

down to 0.

The torque transmitted by unit B increases from 0 up to the value corresponding to $$\frac{bCB2}{Cm_0} = 0.8$$

The ratio $\gamma$ between the power passing through the hydrostatic units and the transmitted power decreases from 1 to 0.

Over this entire first speed range, unit A operates as a motor and unit B as a pump.

At point $X=1$, unit B is blocked by unit A. The coupling $f_1$ can be released from pinion $P_1$ and coupling $f_3$ can then lock pinion $P_3$ to planet-carrier E, with coupling $f_2$ still maintaining gear $R_2$ locked to pinion $P_2$.

One thus passes from the first speed range to the second speed range, A3–B2, which extends from $X=1$ to $X=1.8$.

The direction of flow in unit A is then reversed, the flow per revolution increasing from 0 to a maximum value whereas the flow per revolution of unit B now decreases from its maximum value down to 0 ($X=1.8$).

The speed of unit A decreases from its maximum value down to 0 whereas the speed of unit B, whose sign has reversed, increases from 0 up to its maximum value.

The power passing through the hydrostatic units, defined by $\gamma$, is low; it is nil at both ends of the A3–B2 range and passes through a maximum of about 15%.

Over the entire A3–B2 range, unit A operates a pump and unit B as a motor.

At point $X=1.8$, unit A is blocked by unit B. Coupling $f_2$ can be released from pinion $P_2$, and coupling $f_4$ can lock pinion $P_4$ to the power input shaft M, with coupling $f_3$ still maintaining pinion $P_3$ locked to planet-carrier E, thus passing from the second speed range to the third speed range, A3–B4, which extends from $X=1.8$ to $X=2.6$.

The flow per revolution of unit A now decreases whereas the direction of flow of unit B is reversed, the flow per revolution increasing from 0.

The speed of unit A, whose sign has reversed, increases from 0 to its maximum value, whereas the speed of unit B, which is locked to the engine, remains constant.

The power passing through the hydrostatic units, defined by γ, remains relatively low and increases from 0 up to a maximum of about 31%.

Over the entire A3–B4 range, unit A operates as a motor and unit B as a pump.

The value $r=1.8$ has been chosen by way of a compromise between the value of CA1 at the instant of starting and the value of CB2 in the zone $$X = \frac{2r-1}{4}$$

$X=1$, units A and B being assumed to be identical and being formed of a like number of elements.

The distinctly higher value of CA1 is justified on the one hand by the fact that it is only concerned with starting, and on the other hand by the fact that the rotational speed of unit A is practically nil in this region.

The number of elements for unit A could possibly be increased so as to lower the maximum hydraulic pressure.

A fourth possible coupling combination for the hydrostatic unit consists in coupling unit A with the output shaft through pinion $P_1$ and unit B with the input shaft through pinion $P_4$. This solution thus eliminates the planetary casing; it can be used for the reverse gear for manoeuvring the vehicle.

The FIGURE 5 diagram shows that the described power transmission apparatus makes it possible to vary continuously the speed ratio between the input shaft M and the output shaft S. In this diagram, the particular points $X=0.65$ and $X=2.6$ could for example respectively correspond to locomotive speeds of 37.5 km./h. and 150 km./h.

It will moreover be noted that the change of speed for a hydrostatic unit must be operated just when the other unit is set for zero flow. In this manner, the power transmission is in no way disturbed since at that moment the gear-box operates as a Wilson box, one of the shafts being hydraulically blocked. The shafts or pinions to be coupled theoretically rotate at the same speed, but in practice because of hydraulic losses, it is not quite the same, and the described synchronizers which cooperate with the tubular coupling members 8, 11, and 8′, 11′ enable the required speed and angular position to be achieved.

In the described apparatus, it has been assumed that the continuous speed variator units were hydrostatic units. Other types of units could also be provided, such as belt variators or reversible electric motors alternately operating as a motor or as a generator. Moreover, the power input shaft M and the power output shaft S could be reversed without affecting the operation of the apparatus.

The described power transmission apparatus has the advantage of not being very bulky and of being of simple construction; in this connection it will be observed that it only includes a single set of compound planet gears (triple) and its weight is relatively low compared with known apparatuses.

Further, its efficiency is at least 10% greater than that of conventional transmissions.

The very high efficiency and the small size of the planetary casing and of the hydrostatic units are due to the low percentage of power passing through these units, as has been seen above.

What is claimed is:

1. Power transmission means providing a plurality of speed ranges with continuous speed variation within each range, said means comprising: a pair of power shafts; speed variator means including a least one first and one second variator unit connected to one another and each having a shaft; control means for continuously varying the ratio between the speeds of the shafts of said first and said second unit within each said speed range and for blocking one of the shafts of said first and second variator units at the transistion from one range to the next; epicyclic gearing providing a power connection between said pair of power shafts, said gearing including a planet-carrier, three planet gears mounted together for common rotation on said planet-carrier, and three sun gears respectively meshing with said three planet gears, a first and second of said three sun gears being each permanently drivingly connected with one shaft of said pair of power shafts; first and second coupling means for selectively coupling the shaft of said first variator unit either with a first shaft of said pair of power shafts or with said planet-carrier; third and fourth coupling means for selectively coupling the shaft of said second variator unit either with the third sun gear of said three sun gears or with the second shaft of said pair of power shafts; and means for selectively rendering said coupling means operative to provide three speed ranges, the shaft of said first unit being coupled by said first coupling means with said first power shaft in a first speed range and by said second coupling means with said planet-carrier in the second and third speed ranges, while the shaft of said second unit is coupled by said third coupling means with said third sun gear in said first and second speed ranges and by said fourth coupling means with said second shaft in said third speed range.

2. Power transmission means according to claim 1, wherein said speed variator means comprise a plurality of circularly arranged pairs of said variator units, each pair comprising a first and a second variator unit each consisting of a hydrostatic element with regulatable and reversible flow and said first units and said second units being hydraulically connected in parallel, wherein first and second pinions are mounted on said shaft of each of said first units and respectively mesh with coaxial third and fourth pinions which are selectively engageable by said first coupling means with said first power shaft or by said second coupling means with said planet-carrier; and wherein fifth and sixth pinions are mounted on said shaft of each of said second units and respectively mesh with coaxial seventh and eighth pinions which are selectively engageable with said second power shaft or with said third sun gear.

3. Power transmission means according to claim 2, further comprising four speed and angular position synchronizers each associated with one of said first, second, third and fourth coupling means, for respectively synchronizing the speeds of said first power shaft and said third pinion, of said planet-carrier and said fourth pinion, of said second power shaft and said seventh pinion, and of said third sun wheel and said eighth pinion.

4. Power transmission means according to claim 1, wherein said means for selectively rendering said first, second, third and fourth coupling means operative is constructed to selectively render said first and fourth coupling means operative to provide a fourth speed range in which the entire power is transmitted through said speed variator units.

References Cited

UNITED STATES PATENTS 3,212,358  10/1965  De Lalio _____ 74—687

DONLEY J. STOCKING, *Primary Examiner.*

DAVID J. WILLIAMOWSKY, *Examiner.*

L. H. GERIN, *Assistant Examiner.*

Dedication 3,364,790.—*Jean-Jacques Asper* and *Aymar Lefrancois*, Geneva, Switzerland. POWER TRANSMISSION MEANS. Patent dated Jan. 23, 1968. Dedication filed Mar. 26, 1984, by the assignee, *Battelle Memorial Institute*.

Hereby dedicates to the People of the United States the entire remaining term of said patent.

[*Official Gazette May 29, 1984.*]